US005657530A

United States Patent [19]
Kawamura et al.

[11] Patent Number: 5,657,530
[45] Date of Patent: Aug. 19, 1997

[54] METHOD OF AND APPARATUS FOR INSERTING COINS AND SLOT INSULATORS INTO CORE OF DYNAMOELECTRIC MACHINE

[75] Inventors: Tsutomu Kawamura, Yokkaichi; Naoki Mizutani, Suzuka, both of Japan

[73] Assignee: Kabushiki Kaisha Toshiba, Kawasaki, Japan

[21] Appl. No.: 502,651

[22] Filed: Jul. 14, 1995

[30] Foreign Application Priority Data

Jul. 14, 1994 [JP] Japan .................................. 6-161798

[51] Int. Cl.$^6$ ...................................................... H02K 15/10
[52] U.S. Cl. ............................. 29/596; 29/606; 29/563; 29/564.3; 29/564.6; 29/734; 29/736
[58] Field of Search ............................ 29/596, 606, 34 R, 29/563, 734, 736, 564.1, 564.3, 564.6; 310/10, 27

[56] References Cited

U.S. PATENT DOCUMENTS 5,231,324 7/1993 Kawamura et al. .

FOREIGN PATENT DOCUMENTS

| 61-45732 | 12/1986 | Japan . |
| 3-65109 | 10/1991 | Japan . |
| 4-156245 | 5/1992 | Japan . |
| 4-178133 | 6/1992 | Japan . |
| 4-289744 | 10/1992 | Japan . |

Primary Examiner—Timothy V. Eley
Attorney, Agent, or Firm—Cushman Darby & Cushman IP Group of Pillsbury Madison & Sutro, LLP

[57] ABSTRACT

In a method of inserting motor coils and slot insulators, a coil inserting jig is moved between a layer insulator inserter and a wedge inserter, and a core holder is moved between a predetermined location and the wedge inserter, so that a stator core is fitted onto the coil inserting jig when the coil inserting jig is located at the wedge inserter. The coil inserting jig receives layer insulators from the layer insulator inserter. The layer insulators are inserted into slots of the core with lower coils. Wedges are inserted into the core slots with upper coils when the coil inserting jig is located at the wedge inserter.

15 Claims, 19 Drawing Sheets

METHOD OF AND APPARATUS FOR INSERTING COINS AND SLOT INSULATORS INTO CORE OF DYNAMOELECTRIC MACHINE

BACKGROUND OF THE INVENTION

1. Field of the Invention

This invention relates to a method of and an apparatus for inserting slot insulators such as wedges and layer insulators together with coils into slots of a stator core of a dynamoelectric machine.

2. Description of the Prior Art

The prior art has provided medium and small size electric motors comprising a stator core employing a concentric single-layer winding pattern in which a single layer of coil is inserted in each slot of the stator core. Publication No. 61-45732 (1986) of Japanese examined utility model registration application discloses an apparatus for inserting the coil in each slot and shaping the inserted coil in the case of such a single-layer winding pattern. In the disclosed apparatus, a coil inserting jig and a coil shaping jig are equipped separately from each other. A core holder provided for setting a stator core at a predetermined location is moved along a U-shaped movement path so that coil insertion and shaping are performed. Furthermore, the coil inserting jig and the coil shaping jig are disposed in parallel on a table which is moved transversely. The core holder is moved in the directions perpendicular to the directions in which the table is moved.

On the other hand, publication Nos. 4-156245 (1992) and 4-178133 (1992) of Japanese unexamined patent applications, each disclose concentric and lap double-layer winding patterns. The size of the wedge differs from that of the layer insulator in these winding patterns. Accordingly, the wedges and the layer insulators cannot be inserted by a single apparatus having the above-described coil inserting and shaping mechanism for the concentric single-layer winding pattern when the coils, slot insulators and the wedges are inserted into the core slots so as to form the concentric or lap double-layer winding. This poses a problem.

SUMMARY OF THE INVENTION

Therefore, an object of the present invention is to provide a method of and an apparatus for readily inserting, together with coils, wedges and layer insulators having sizes different from each other into core slots of a dynamoelectric machine.

The present invention provides an improved method of inserting coils and slot insulators into slots of a stator core of a dynamoelectric machine. In the method, a coil inserting jig is moved to a layer insulator inserter, and a plurality of layer insulators are transferred from the layer insulator inserter to the coil inserting jig. The coil inserting jig and a core holder holding the core are then moved to a wedge inserter, and the core is fitted onto the coil inserting jig holding a plurality of first coils. The layer insulators and the first coils both held on the coil inserting jig are inserted into a plurality of slots of the core by the wedge inserter respectively. The coil inserting jig is then moved to the layer insulator inserter, and a lower layer insulator is transferred from the layer insulator inserter to the coil inserting jig. The coil inserting jig and the core holder are moved to the wedge inserter, and the core held on the core holder is fitted onto the coil inserting jig holding a plurality of second coils. A plurality of upper wedges held on the wedge inserter, the layer insulators and the second coils both held on the coil inserting jig are inserted into the slots of the core by the wedge inserter respectively. The core held on the core holder is fitted onto the coil inserting jig holding a plurality of third coils. Another plurality of wedges and the third coils held on the coil inserting jig are inserted into the slots of the core by the wedge inserter respectively.

The above-described method of the present invention is characterized in that the coil inserting jig is moved between the layer insulator inserter and the wedge inserter, that the core holder is moved between a predetermined location and the wedge inserter, and that the core is fitted onto the coil inserting jig when both the coil inserting jig and the core holder have been moved to the wedge inserter. The layer insulator inserter transfers the layer insulators to the coil inserting jig while the wedge inserter pushes the wedges held therein, the layer insulators, and the coils both held on the coil inserting jig out into the slots of the core. Since the layer insulators and the wedges are shaped into predetermined sizes and pushed out by the dedicated inserters respectively, the differences in the size and the configuration between the wedges and the layer insulators do not impede insertion of them into the core slots. Furthermore, the coil inserting jig is moved between both inserters, and the core holder is moved relative to the wedge inserter, so that the layer insulators, the wedges and the coils are automatically inserted into the core slots.

The present invention also provides an improved apparatus for inserting coils and slot insulators into slots of a stator core of a dynamoelectric machine. The apparatus comprises a base, a layer insulator inserter for cutting an insulating material into a plurality of cut pieces, for shaping the cut pieces of the insulating material into a plurality of layer insulators, and for pushing the layer insulators out, a wedge inserter for cutting another insulating material into a plurality of cut pieces, for shaping the cut pieces of the insulating material into a plurality of wedges, and for pushing the wedges out, a coil inserting jig having a plurality of insulator guides each movable between both inserters for guiding the layer insulators pushed out of the layer insulator inserter when moved to the layer insulator inserter side and for guiding the wedges pushed out of the wedge inserter when moved to the wedge inserter side. The coil inserting jig further has a coil guide for guiding a plurality of coils, a core holder movably mounted on the base for holding the core having a plurality of slots, and for fitting the core onto the coil inserting jig when moved to the wedge inserter side, and a stripper provided on at least one of the layer insulator inserter and the wedge inserter, for pushing out the coils held on the coil guide of the coil inserting jig.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
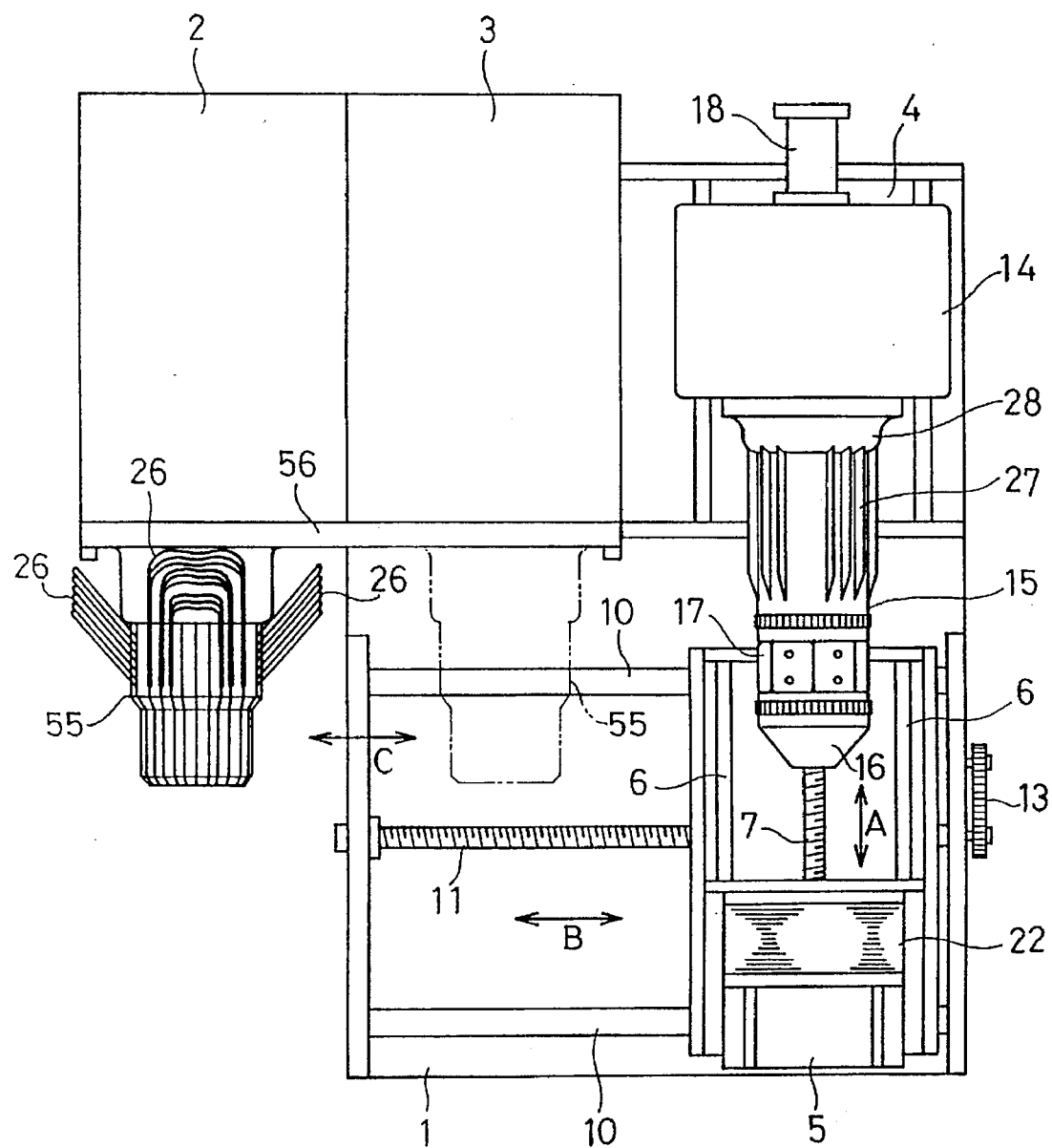
FIG. 1 is a plan a view of an apparatus of one embodiment in accordance with the present invention.

One embodiment of the present invention will be described with reference to the drawings. Referring to FIG. 1, an overall construction of an apparatus according to the present invention is shown. A layer insulator inserter 2, a wedge inserter 3, and a coil shaper 4 are provided on the rear (upper side as viewed in the figure) of a base 1 so as to be disposed one after another. A core holder 5 is provided on the front (lower side as viewed in the figure) of the base 1.

Figure 2:
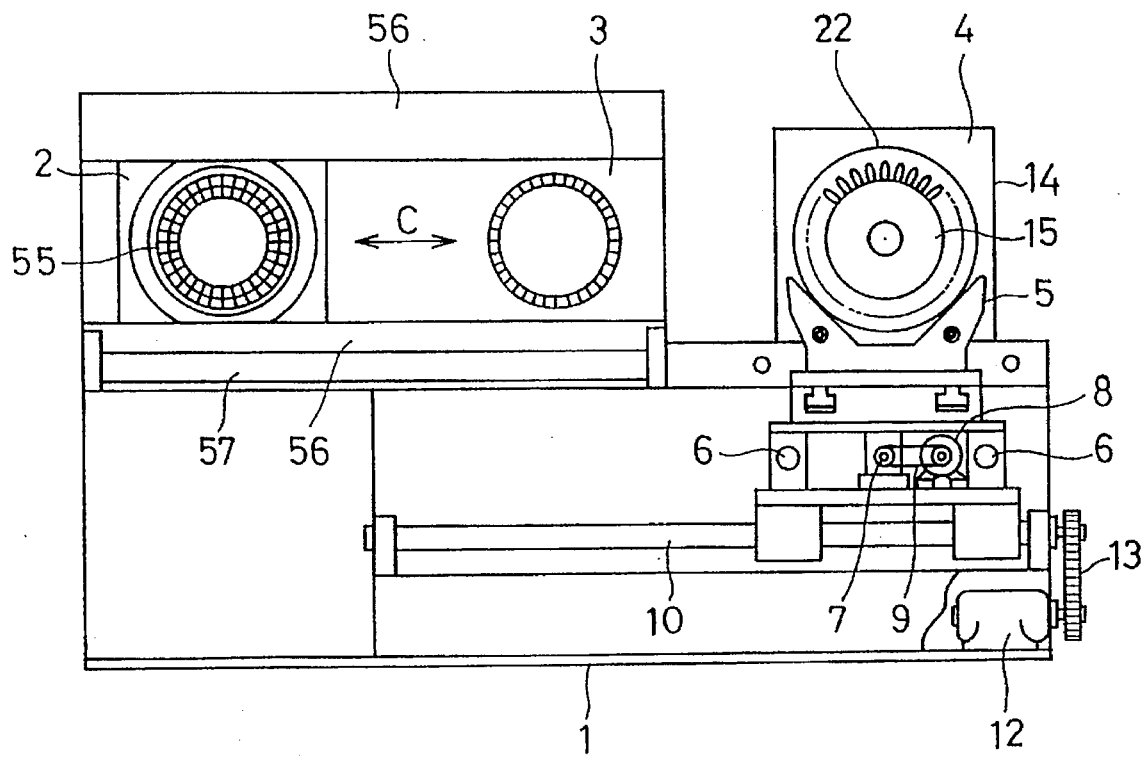
FIG. 2 is a front view of the apparatus.

The core holder 5 is moved along two parallel slide bars 6 back and forth or in directions as shown by arrow A in FIG. 1. A threaded bar 7 extends through the central portion of the core holder 5 in a screwing engagement relation. An electric motor 8 and a belt transmission mechanism 9 are provided on the front of the base 1 for rotating the threaded bar 7 so that the core holder 5 is moved back and forth, as shown in FIG. 2. The core holder 5 is further moved along two parallel slide bars 10 right and left or in directions shown by arrow B in FIG. 1. The slide bars 10 are disposed below the slide bars 6. Another threaded bar 11 extends perpendicularly to the threaded bar 7 through the central portion of the core holder 5 in a screwing engagement relation. An electric motor 12 and a gear transmission mechanism 13 are provided on the righthand side of the base 1 for rotating the threaded bar 11 so that the core holder 5 is moved right and left, as shown in FIG. 2.

Figure 3:
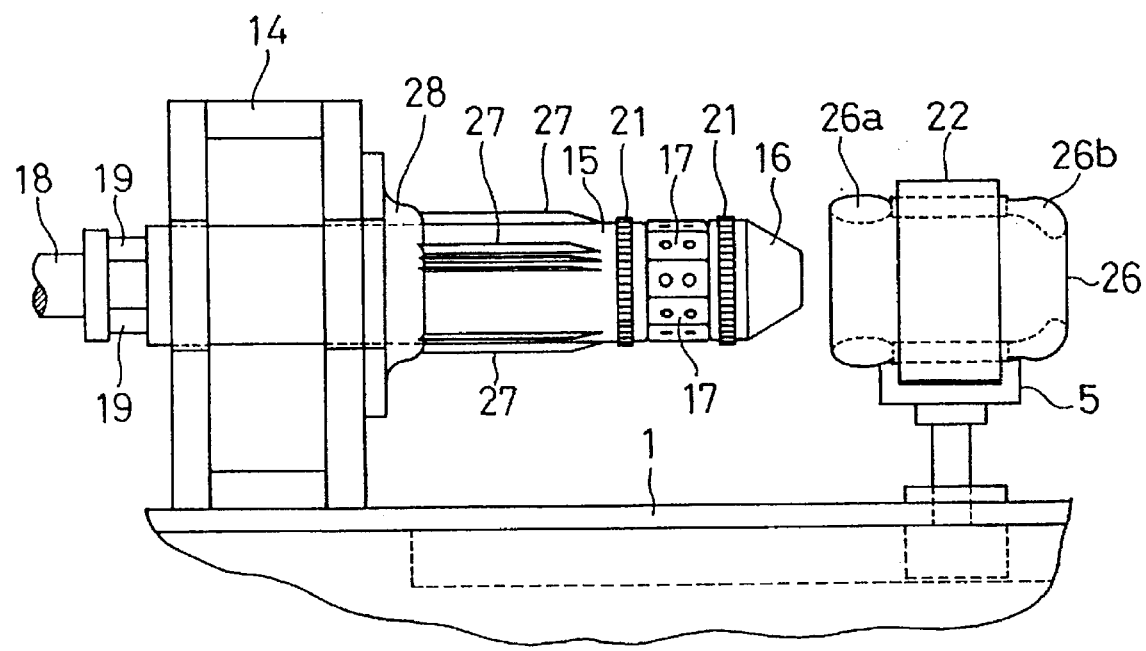
FIG. 3 is a side view of a coil shaper incorporated in the apparatus.
Figure 4:
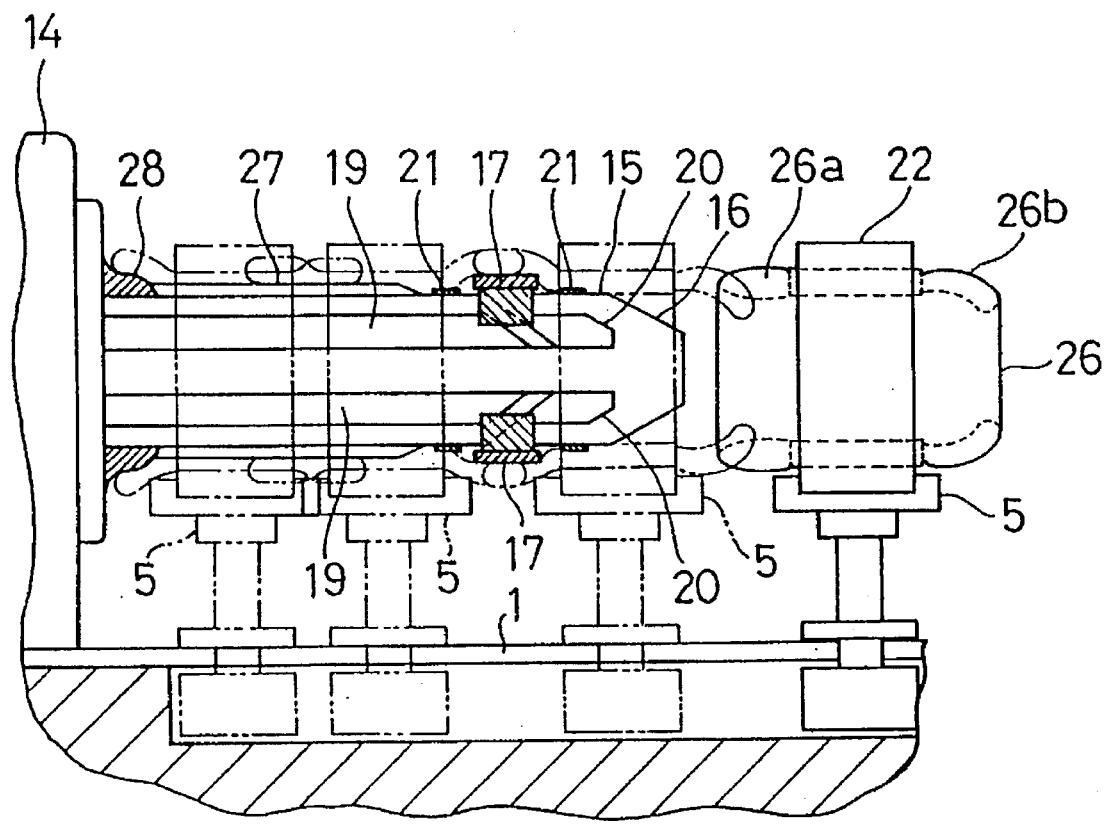
FIG. 4 is a longitudinally sectional side view of the coil shaper.
Figure 5:
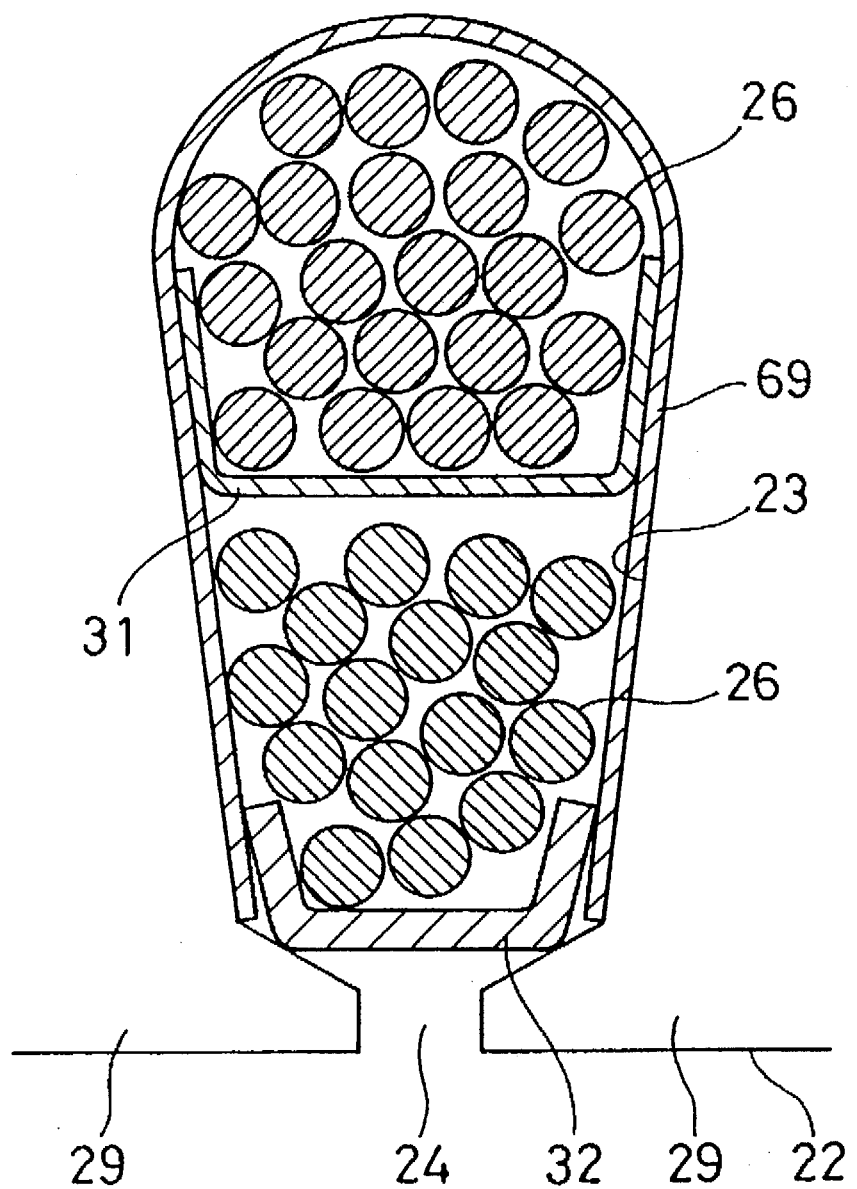
FIG. 5 is an enlarged longitudinally sectional front view of a slot of a stator core of a dynamoelectric machine.
Figure 14:
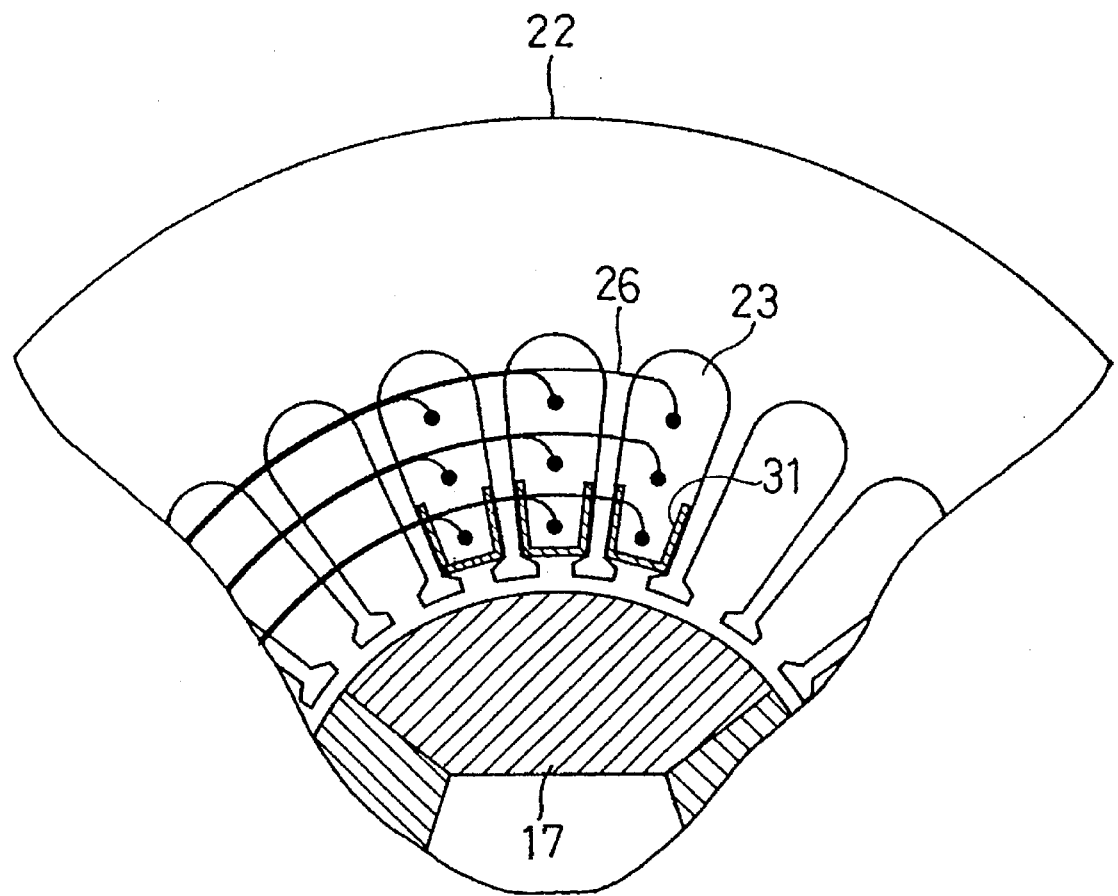
FIG. 14 is a partial longitudinal section of the stator core, showing the condition that first layer coils have been inserted in the slots.

The coil shaper 4 comprises a guide cylinder 15 mounted on a mounting frame 14 which is further mounted on the base 1. The guide cylinder 15 has a bullet-shaped guide portion 16 at the distal end thereof as shown in FIG. 3. A plurality of expanding pieces 17 are annularly disposed around the guide cylinder 15 in the rear of the guide portion 16. Also see FIG. 14. A plurality of planks 19, the number of which is identical with that of the expanding pieces 17, are inserted in the guide cylinder 15 so as to be annularly disposed, as shown in FIG. 4. Each plank 19 is moved forward and backward integrally with a piston 18 by a cylinder (not shown) provided in the rear of the piston. Each plank 19 has a tapered inclined face 20 at the distal end thereof. The guide cylinder 15 further has a number of protrusions 21 which are formed in front and in the rear of the expanding portions 17 so as to be annularly disposed around the guide cylinder. Each protrusion 21 is fitted in an opening 24 of each slot 23 of a stator core 22 without abutment against a wedge 32, whereby displacement of the stator core 22 can be prevented when fitted on the guide cylinder 15.

Figure 15:
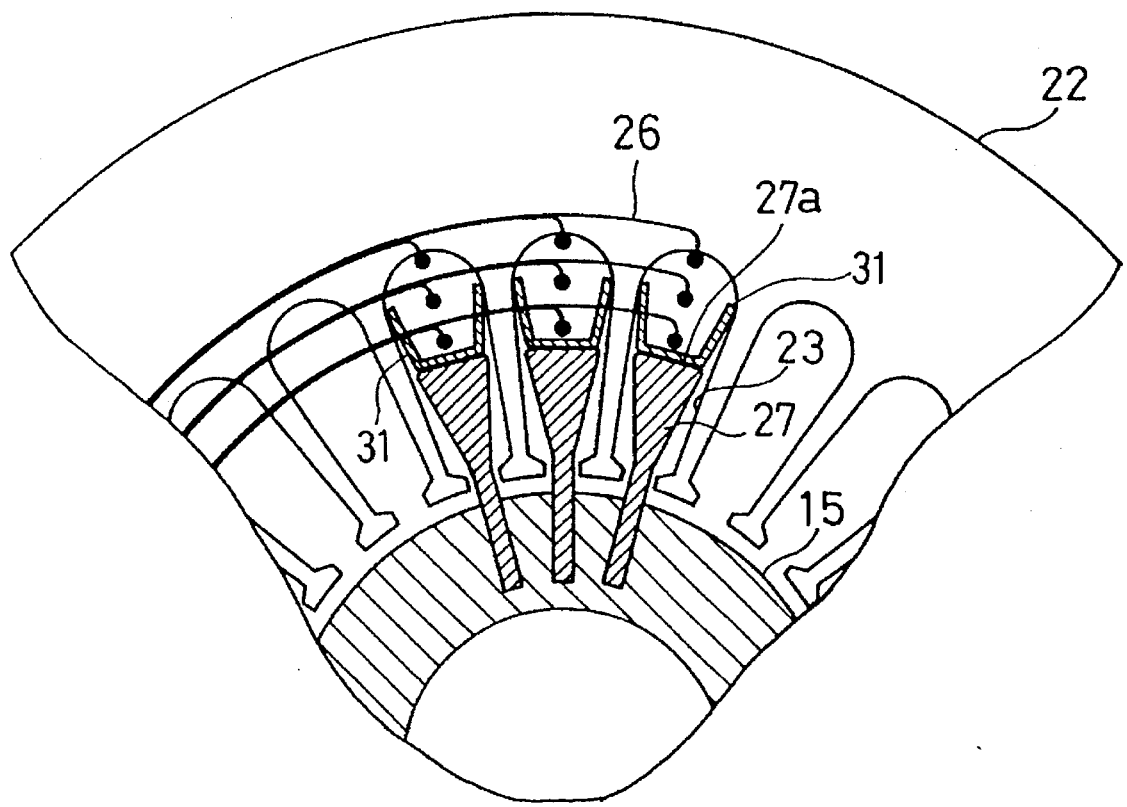
FIG. 15 is a partial longitudinal section of the stator core, showing the shaped state of the coils by shaping fins.

Shaping fins 27 are radially disposed at the rear of the protrusions 21 on the guide cylinder 15 The number of the shaping fins 27 is the same as that of the core slots 23 into which coils 26 are inserted at one time. The height of each shaping fin 27 is set for or below two thirds of the depth of each slot 23. Preferably, the height of each shaping fin 27 is approximately two thirds of the depth of each slot 23 so that a remaining volume of each slot 23 unoccupied by the coil 26 becomes approximately one half of the whole volume of each slot 23 when the coil 26 has been inserted in each slot 23. See FIG. 15. Furthermore, the width of each shaping fin 27 is gradually increased from the portion corresponding to the opening 24 of each slot 23 in the direction of the bottom thereof, so that the coil 26 can be sufficiently pressed by each shaping fin 27. Each shaping fin 27 has at the distal end thereof a flat surface 27a as shown in FIG. 15.

Figure 6:
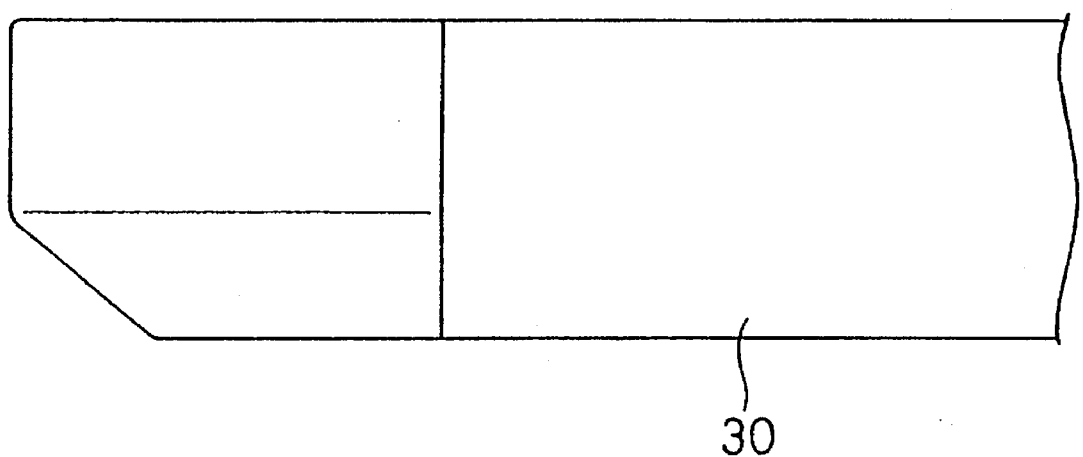
FIG. 6 is a partial side view of a cuff holder employed with the apparatus.

The guide cylinder 15 is adapted to be rotated by a selected angle by a drive mechanism (not shown). The core holder 5 is designed to be stopped, during its movement, at a first shaping location where the front coil end 26a of the stator core 22 is fitted onto the annularly disposed expanding pieces 17, at a second shaping location where the rear coil end 26b of the stator core 22 is fitted onto the expanding pieces 17, and at a third shaping location where the front coil end 26a is butted against a shaping die 28 provided at the root portion of the guide cylinder 15. Tapered cuff holders 30 as shown in FIG. 6, the number of which corresponds to that of teeth 29 of the stator core 22, are annularly provided at the front and rear coil end sides of the core holder 5 respectively. The cuff holders 30 are driven by a drive mechanism (not shown) to thereby be inserted into and drawn out of the slots 23.

Figure 8:
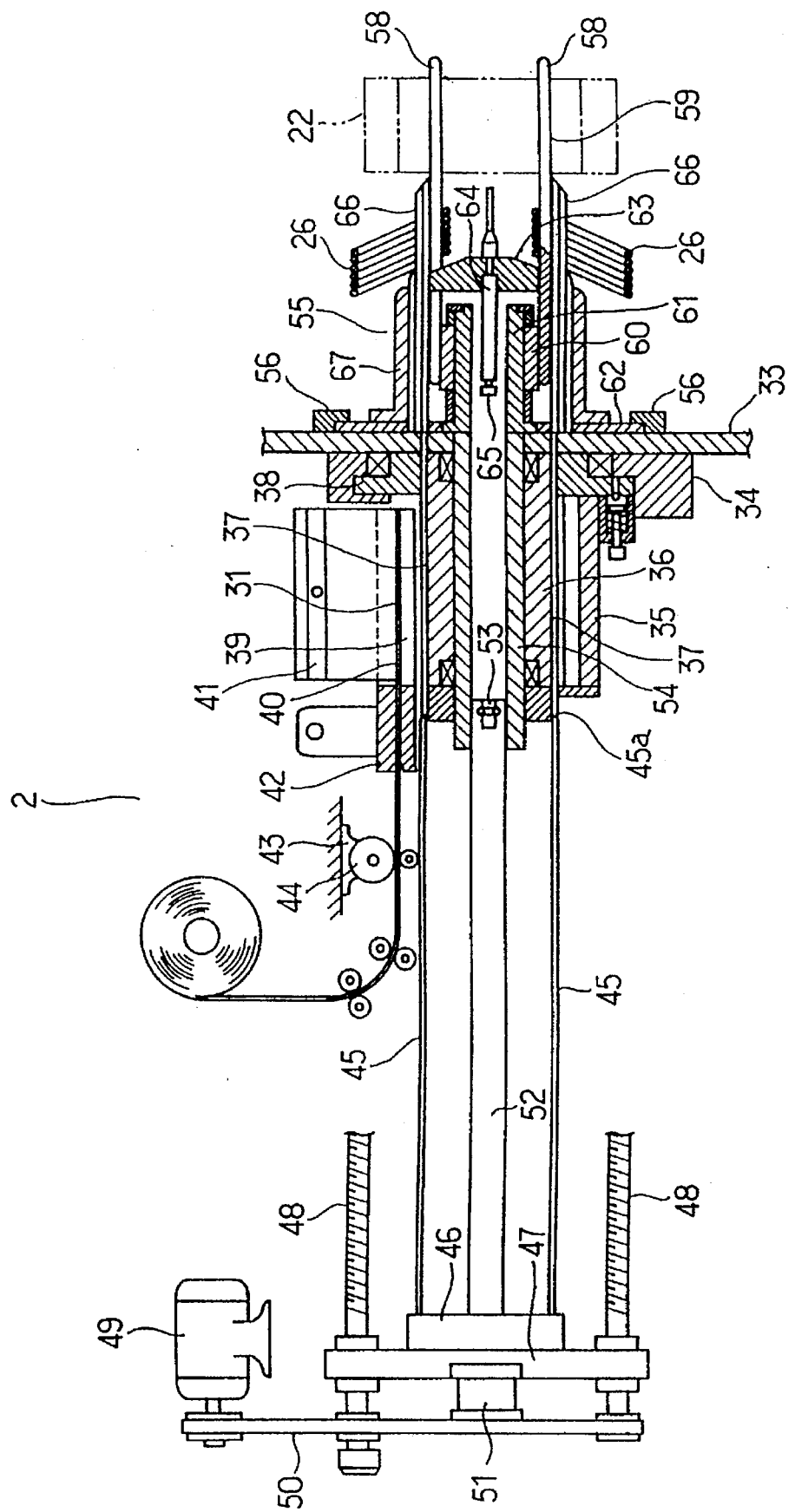
FIG. 8 is a longitudinally sectional side view of a layer insulator inserter and the coil inserting jig.

The insulator layer 31 and the wedge 32 are made of the same material and differ only in the depth and the length. Accordingly, the layer insulator inserter 2 and the wedge inserter 3 have the same basic construction. FIG. 8 exemplarily illustrates the layer insulator inserter 2. The layer insulator inserter 2 comprises a stationary base 33 to which an annular holder 34 is fixed. A cylindrical casing 35 is coupled to the holder 34. A layer insulator magazine 36 (a wedge magazine in the wedge inserter) is rotatably mounted in the casing 35. The layer insulator magazine 36 has a plurality of grooves 37 formed therein. Each groove 37 allows the layer insulator 31 (the wedge 32 in the wedge inserter) to pass therethrough. The grooves 37 of the layer insulator magazine 36 differ from those of the wedge inserter 3 in the width and the length according to the difference in the width and the length between the layer insulator 31 and the wedge 32. The layer insulator magazine 36 is rotated via a ratchet 38 by a drive source (not shown).

A jig 39 is mounted in a window formed in the outer peripheral portion of the casing 35. The jig 39 defines the above-described layer insulator path (wedge path in the wedge inserter 3) and a punch guide hole 40, in which a punching plate 41 is inserted. The punching plate 41 moved vertically by a drive mechanism (not shown) as viewed in FIG. 8. A cutter 42 is disposed to be in contact with the jig 39. A layer insulator feeding motor 43 (a wedge feeding motor in the wedge inserter) is disposed in the vicinity of the cutter 42. A roller 44 is mounted on a rotational shaft of the layer insulator feeding motor 43 to be rotated for feeding a rolled material of the layer insulator 31 (a rolled material of the wedge 32 in the wedge inserter) per selected length to the side of the cutter 42.

A plurality of layer insulator pushers 45 (wedge pushers in the wedge inserter) are annularly arranged in the rear of the layer insulator magazine 36 so as to correspond to the grooves 37. Each pusher 45 has a distal end 45a opposite to the corresponding groove 37 and a proximal end fixed to a fixture 46 further fixed to a moving base 47. Two ball screws 48 are provided for supporting the moving base 47. The ball screws 48 are rotated via a belt transmission mechanism 50 by a servomotor 49 so that the layer insulator pushers 45 are moved back and forth (left and right in the figure) along the ball screws 48 together with the moving base 47.

A cylinder 51 is also mounted on the moving base 47 and moves a rod 52. The distal end of the rod 52 formed with an engaging portion 53 fronts on the interior of a guide cylinder 54 provided in the layer insulator magazine 36. A movement stroke of each layer insulator pusher 45 moved by the servomotor 49 is shortened by a movement stroke of the rod 52 moved by the cylinder 51. The movement stroke of the rod 52 is about one half of the difference in the overall length between the layer insulator 31 and the wedge 32.

A coil inserting jig 55 is provided on the front of the layer insulator inserter 2 or the wedge inserter 3 so as to be moved along two parallel guides 56 in the directions of arrow C or right and left as viewed in FIGS. 1 and 2. A drive cylinder 57 for moving the coil inserting jig 55 is provided at the lower front of the layer insulator inserter 2 and the wedge inserter 3. The coil inserting jig 55 has a coil guide 59 which comprises a plurality of blades 58 annularly arranged at equal intervals. Each blade 58 is fixed at one end thereof to a blade holder 60, which is connected to a hollow shaft 61. The shaft 61 is mounted on a slide base 62 which is slidably fitted in the guides 56.

Figure 7:
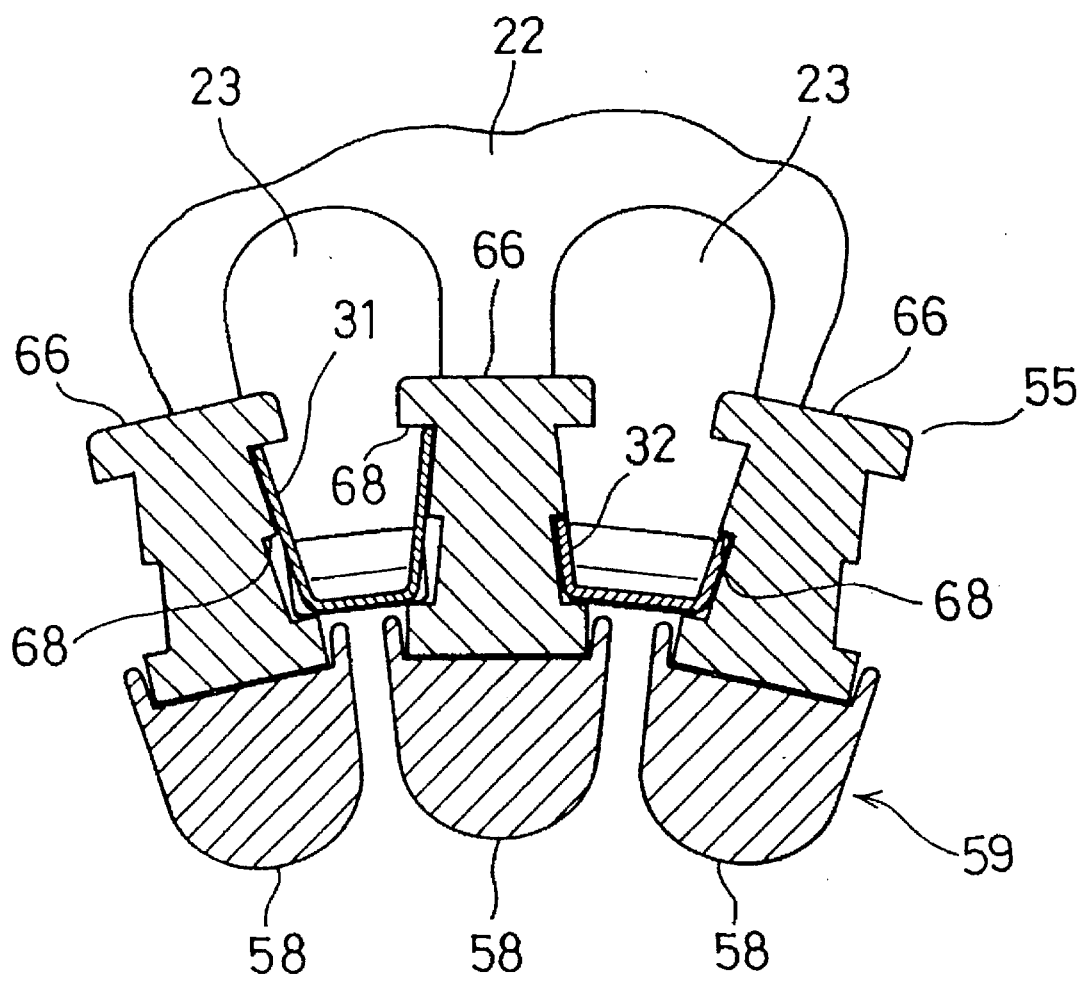
FIG. 7 is a longitudinally sectional front view of an insulator guide a coil inserting jig.

A stripper 63 is provided inside the coil guide 59 so as to be slidable back and forth. A stripper shaft 64 is connected to the stripper 63. The stripper shaft 64 has an engaged portion 65 which is engaged with and disengaged from the engaging portion 53 of the rod 52. A plurality of insulator guides 66, the number of which corresponds to that of the blades 58, are annularly disposed outside the coil guide 59 and connected to a cylindrical holder 67, which is mounted on the slide base 62, as shown in FIG. 7. Each insulator guide 66 has a plurality of engagement portions 68 formed in a face along which the layer insulator 31 and the wedge 32 differing only in depth and length pass during the insertion of the coils.

Figure 9:
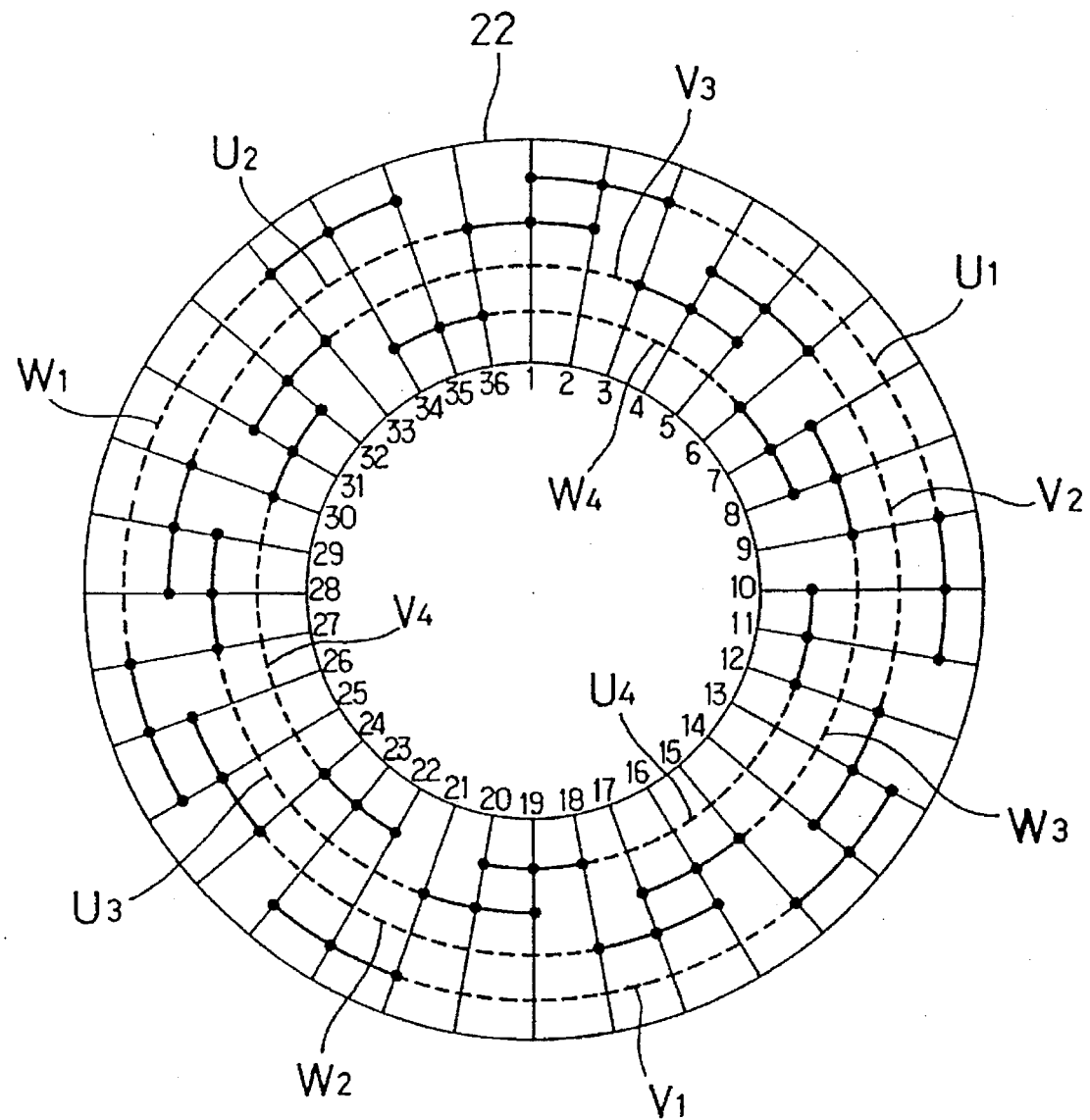
FIG. 9 illustrates a wiring pattern applied in the embodiment.

The operation of the apparatus will now be described. The description of the operation relates to the case where the stator core 22 has a 4-pole 36-slot arrangement and coils are disposed in the slots so that a winding pattern as shown in FIG. 9 is formed. First, the coil inserting jig 55 is arranged to be on standby in front of the layer insulator inserter 2 as shown in FIG. 1. The layer insulator feeding motor 43 is then operated to feed the rolled layer insulator material by the selected length toward the cutter 42. The material fed out is cut by the cutter 42, and the cut pieces of the layer insulators 31 are retained over the respective grooves 37.

The punching plate 41 is subsequently operated so that the cut layer insulators 31 are thrust into the respective grooves 37 of the layer insulator magazine 36, being bent by the punch guide 40 into a U-shape as shown in FIG. 7. The layer insulator magazine 36 is rotated by a predetermined angle (10 degrees in the stator core with 36 slots) via the ratchet 38 by a drive source (not shown) when one layer insulator 31 has been thrust in the groove 37. The above-described operation is repeated so that the layer insulators 31 are thrust into the eighteen grooves 37 of the layer insulator magazine 36 respectively.

The servomotor 49 is then operated so that the ball screws 48 are rotated to advance the moving base 47. As the result of advancement of the moving base 47, the layer insulator pusher 45 pushes the layer insulator 31 in the groove 37 into the insulator guide 66. The servomotor 49 is turned off when the layer insulator 31 has been inserted in and engaged with the insulator guide 66 to thereby be held in position. In the meantime, the coils 26 wound at another step are laid between two blades 58 of the coil inserting jig 55. The two blades 58 are away from each other by a predetermined pitch. Thereafter, when the drive cylinder 57 is operated, the coil inserting jig 55 is moved to the right from the position shown in FIG. 2 to the front of the wedge inserter 3 in FIGS. 10 and 11. In the meantime, the wedge inserter 3 is not operated, and no wedges 32 are retained in the respective grooves 37 of the wedge magazine 36.

Figure 12:
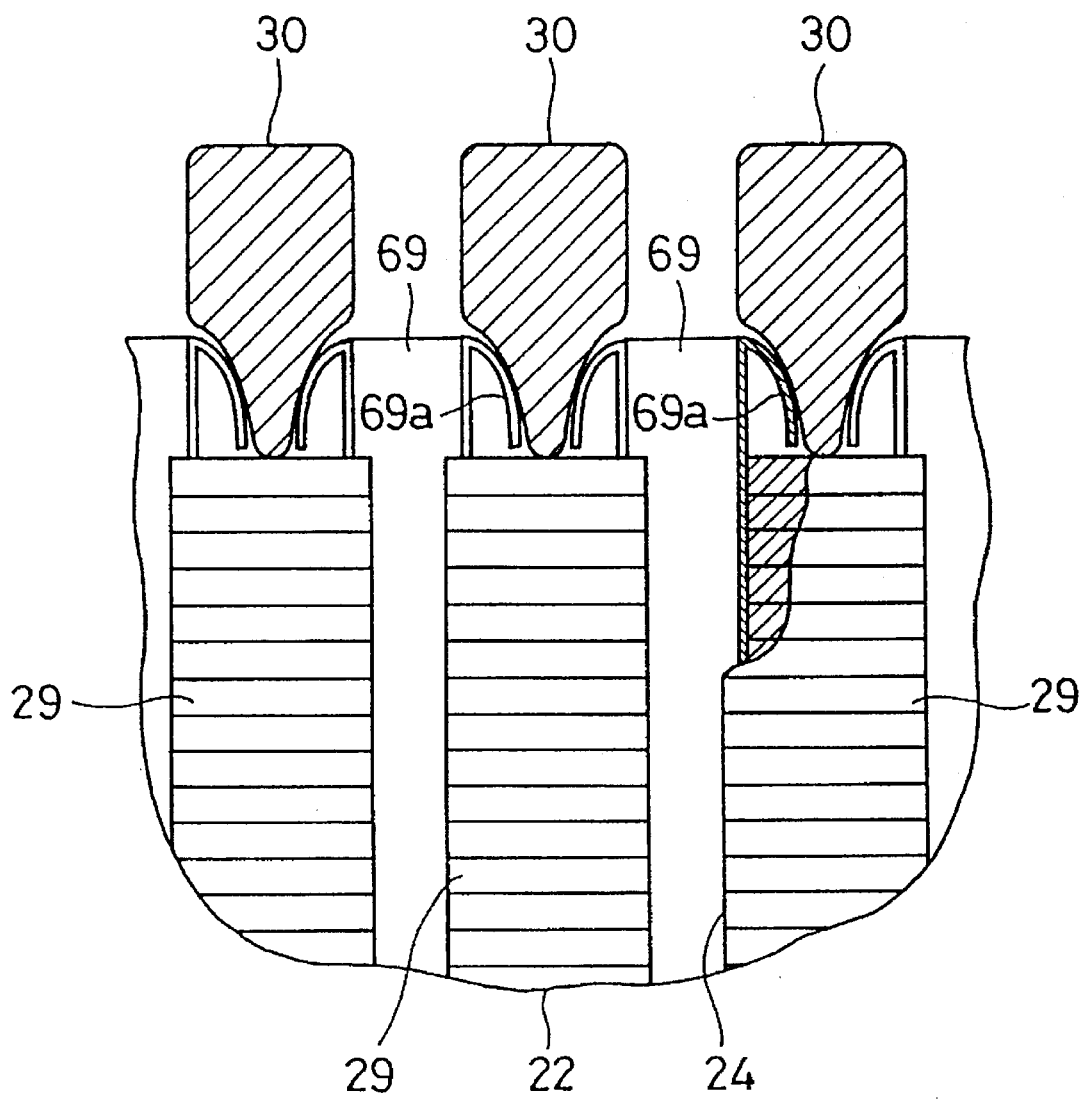
FIG. 12 is a partial transverse section of slots of the stator core and coil guides.
Figure 13:
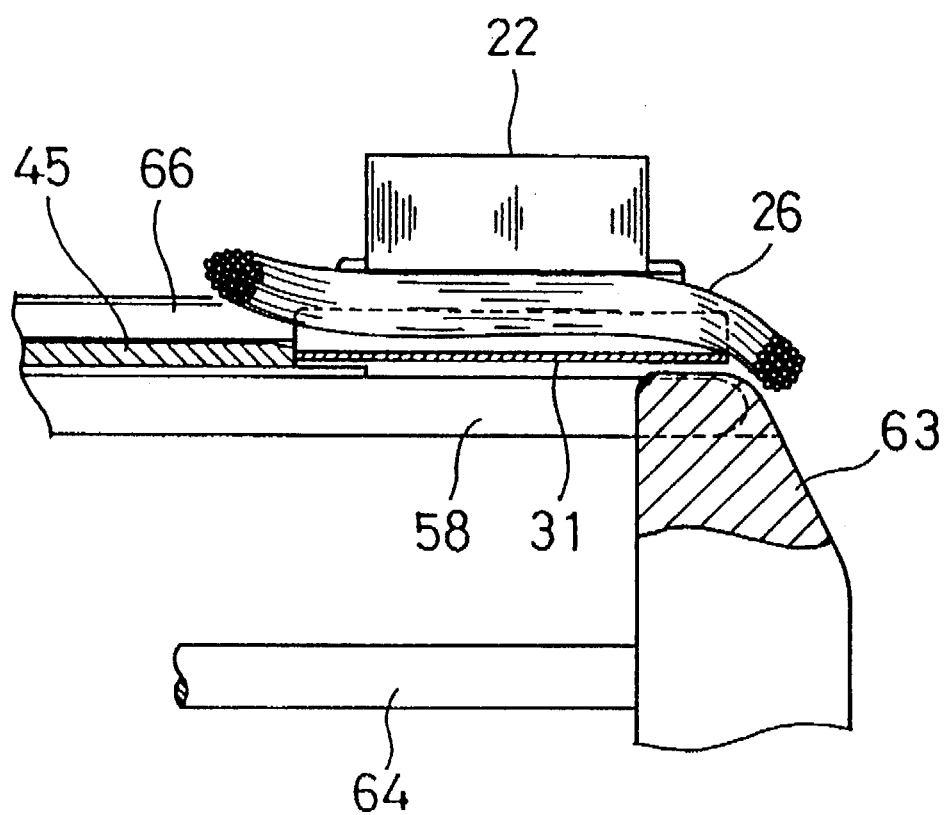
FIG. 13 is a partial longitudinally sectional side view of a wedge inserter in a layer insulator inserting operation.

Subsequently, the stator core 22 is mounted to the core holder 5 assuming the position as shown in FIG. 1. The cuff holders 30 are driven by a drive source (not shown) to be inserted between one cuff 69a of the slot insulators 69 and the opposite cuff 69a of the adjacent slot insulators 69 respectively so as so be in contact with the cuffs 69a, as shown in FIG. 12. These slot insulators 69 are held in the respective slots 23. Upon operation of the motor 12, the thread bar 11 is rotated so that the core holder 5 is moved to the front of the coil inserting jig 55 located in front of the wedge inserter 3 and then stopped. Thereafter, the motor 8 is operated to rotate the thread bar 7. By rotation of the thread bar 7, the core holder 5 is further moved to the side of the coil inserting jig 55 so that the stator core 22 is fitted onto the coil inserting jig 55 as shown by the two-dot chain line in FIG. 8.

The servomotor 49 is then operated to rotate the ball screws 48 so that the moving base 47 is advanced. As the result of advancement of the moving base 47, the wedge pushers 45 pass through the respective grooves 37 of the wedge magazine 36, pushing the layer insulators 31 engagingly held in the insulator guide 66 as shown in FIG. 7. Simultaneously, the rod 52 having been advanced in the guide cylinder 54 engages the engaging portion 53 with the engaged portion 65 of the stripper shaft 64, thereby pushing the stripper 63. The layer insulators 31 and the coils 26 are pushed by the wedge pushers 45 and the stripper 63 to be completely inserted in the slots 23 of the stator core 22. Thus, lowermost or first layer coils U1, V1 and W1 are inserted in the slots 23.

Since the layer insulator 31 is longer than the wedge 32, the rod 52 is previously advanced by the cylinder 51 so that the stripper 63 is set to move forward by one half of the difference in the overall length between the layer insulator 31 and the wedge 32. An amount of movement of each layer insulator pusher 45 is relatively decreased accordingly. Furthermore, a limit pushing position of the stripper 63 is determined by control of an energization time period of the servomotor 49. A limit switch or the like may be used for this purpose, instead.

Subsequently, reverse rotation of the servomotor 49 returns the stripper 63 and the wedge pushers 45 to the respective former locations. The motors 8 and 12 are reverse rotated to return the core holder 5 to the former location as shown in FIG. 1.

The working sequence then proceeds to a step of shaping coil ends. The former location to which the core holder 5 has been returned is referred to as a preparatory location as shown by solid line in FIG. 4. The coil end 26a of each coil 26 of the stator core 22 is opposite to the coil shaper 4 when the core holder 5 assumes the preparatory location. The guide cylinder 15 is previously rotated by a drive source (not shown) so that the shaping fins 27 correspond to slots 23 into which second layer coils U2, V2 and W2 are to be inserted as shown in FIG. 9. Under this condition, the motor 8 is operated to move the core holder 5 to a first shaping location so that the forward coil end 26a of each coil 26 is fitted onto the expanding pieces 17. A cylinder (not shown) is then actuated so that the piston 18 advances the planks 19. Consequently, the expanding pieces 17 are radially expanded by the planks 19, whereby the forward coil end 26a is pressed outwardly to be thereby shaped into a predetermined expanded configuration.

The planks 19 are thereafter returned to move the expanding pieces 17 in such a direction that the diameter thereof is reduced. The core holder 5 is then moved to a second shaping location, where the rearward coil end 26b of each coil 26 is fitted onto the expanding pieces 17. The rearward coil end 26b of each coil 26 is shaped into the expanded configuration in the same manner as described above. The planks 19 are thereafter returned to move the expanding pieces 17 in such a direction that the diameter thereof is reduced. The core holder 5 is then moved to a third shaping location, where the forward coil ends 26a are pushed against the shaping die 28 at the root portion of the guide cylinder 15 and shaped into a predetermined expanded configuration. Simultaneously, the first-layer coils 26 are pressed toward the slot bottom by the shaping fins 27 so as to be shaped into a predetermined final configuration, as shown in FIG. 15. Furthermore, each layer insulator 31 is also pressed toward the slot bottom. The shaping of the first-layer coils is thus completed.

Insertion of second-layer coils U2, V2 and W2 into the respective slots 23 will be described. The core holder 5 is at standby as shown in FIG. 1. Under this condition, the same operation as in the insertion of the first-layer coils U1, V1 and W1 is performed. As understood from FIG. 9, however, the second-layer coils U2, V2 and W2 include lower coils which are to be inserted into the lower spaces of the slots 23 and upper coils which are to be inserted into the upper spaces of the slots 23. The layer insulator 31 is required for each slot 23 into which the lower coil is inserted as in the first-layer coils U1, V1 and W1. On the other hand, the wedge 32 is required for each slot 23 into which the upper coil is inserted.

Insertion of the layer insulators 31 is performed basically in the same manner as described above regarding the first-layer coils U1, V1 and W1. Regarding six slots 23 into which the upper coils are to be inserted, however, the steps of cutting and shaping the layer insulators 31 by the layer insulator inserter 2 and the step of inserting the layer insulators 31 into the respective insulator guides 66 are not executed. Regarding the other twelve slots 23 into which the lower coils are to be inserted, the steps of cutting and shaping the layer insulators 31 are executed in the same manner as described above. Thereafter, the servomotor 49 is driven so that the twelve layer insulators 31 are inserted into the insulator guides 66 to be held in them. Subsequently, the coil inserting jig 55 with the coils 26 being laid between the blades 58 is moved to the front of the wedge inserter 3. In the meantime, six wedges 32 for the slots 23 into which the upper coils are to be inserted are cut and shaped by the wedge inserter 3 in the same manner as in the layer insulator inserter 2. The cut and shaped wedges 32 are then held in the grooves 37 of the wedge magazine 36.

Figure 10:
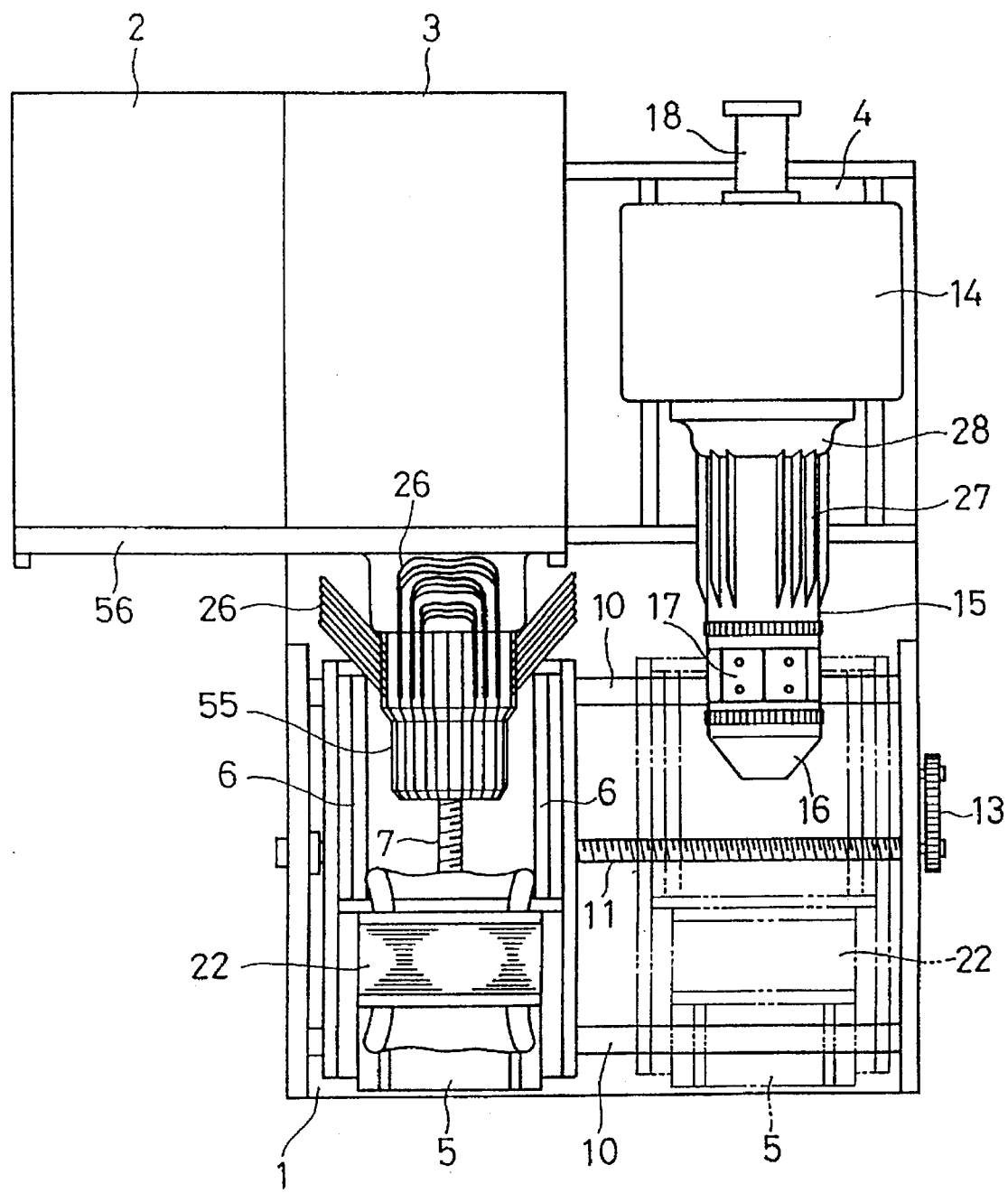
FIG. 10 is a plan view of the whole apparatus in a coil inserting operation.
Figure 11:
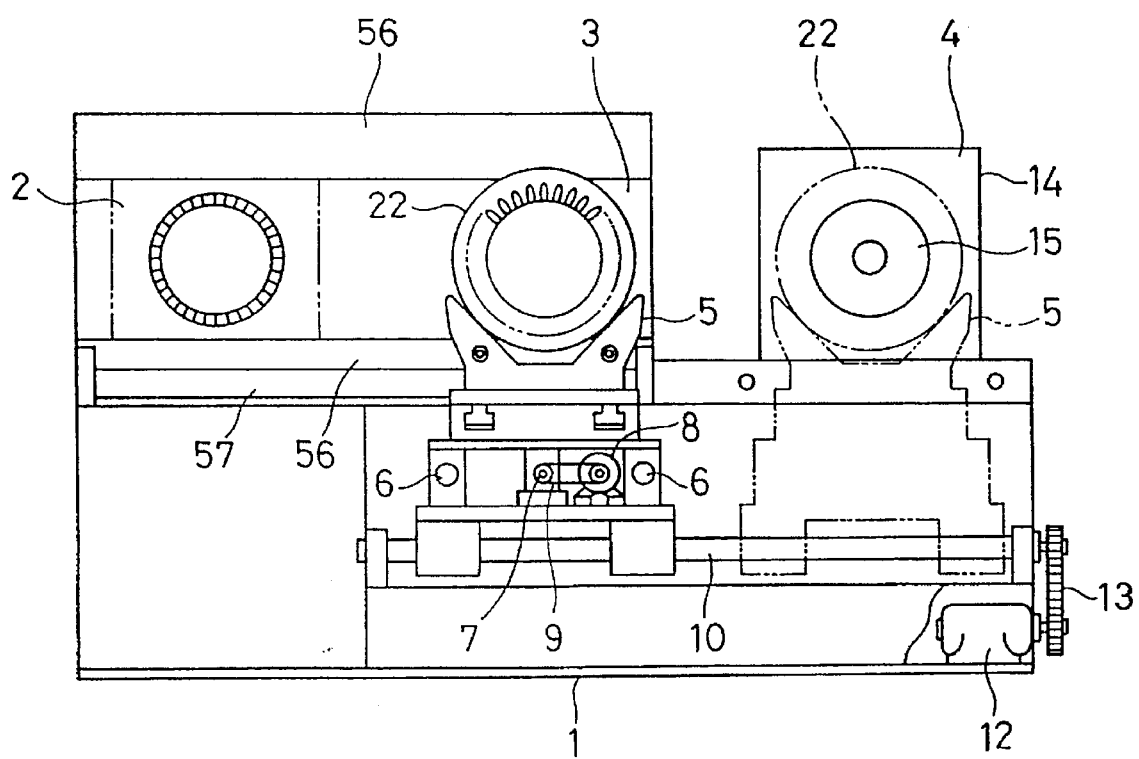
FIG. 11 is a front view of the whole apparatus in the coil inserting operation.

The core holder 5 holding the stator core 22 is moved from the standby position in FIG. 1 to the front of the wedge inserter 3 as shown in FIGS. 10 and 11. The core holder 5 is further moved to the side of the coil inserting jig 55 so that the core 22 is fitted onto the coil inserting jig 55. Under this condition, the servomotor 49 is driven to advance the moving base 47. Then, each wedge pusher 45 inserts the six wedges 22 held in the grooves 37 into the insulator guides 66. The moving base 47 is further advanced so that the wedges 32 are inserted into the core slots 23 together with the twelve layer insulators 31 previously held in the insulator guides 66. In this regard, although the layer insulator 31 and the wedge 32 differ in the length from each other, the wedge pusher 45 is moved so that the distal end 45a thereof assumes the same location as in the insertion of the first-layer coils. Position correction of the wedges 32 is manually performed.

The motors 49, 8 and 12 are reverse rotated to return the moving base 47 and the core holder 5 to the respective former positions after insertion of the layer insulators 31 and the wedges 32. The coils 26 are shaped in the same manner as described above. The shaping fins 27 are previously positioned so as to pass an insertion position for third-layer coils U3, V3 and W3.

Subsequently, the third-layer coils U3, V3 and W3 are inserted into the core slots 23 in the same manner as described above. The shaping fins 27 are positioned so as to pass an insertion position for fourth-layer coils U4, V4 and W4 for a subsequent coil shaping step. Thus, subsequent layer coils are shaped when the coils 26 having been inserted in the slots 23 are shaped. Consequently, a sufficient unoccupied space can be obtained in each slot 23, and the coils, layer insulators 31 and wedges 32 of the subsequent layers can be readily inserted into the slots.

Finally, insertion of fourth-layer coils U4, V4 and W4 will be described. All of the fourth-layer coils U4, V4 and W4 are to be inserted in the upper spaces of the respective slots 23. Accordingly, since only the wedges 32 are necessary and the layer insulators 31 are unnecessary, the layer insulator inserter 2 is not operated. After the coils 26 are laid between the blades 58 of the coil inserting jig 55 in front of the layer insulator inserter 2, the coil inserting jig 55 is moved to the front of the wedge inserter 3. In the meantime, a necessary number of wedges 32 (eighteen in the embodiment) are cut and shaped by the wedge inserter 3 and further held in the wedge magazine 36.

Figure 16:
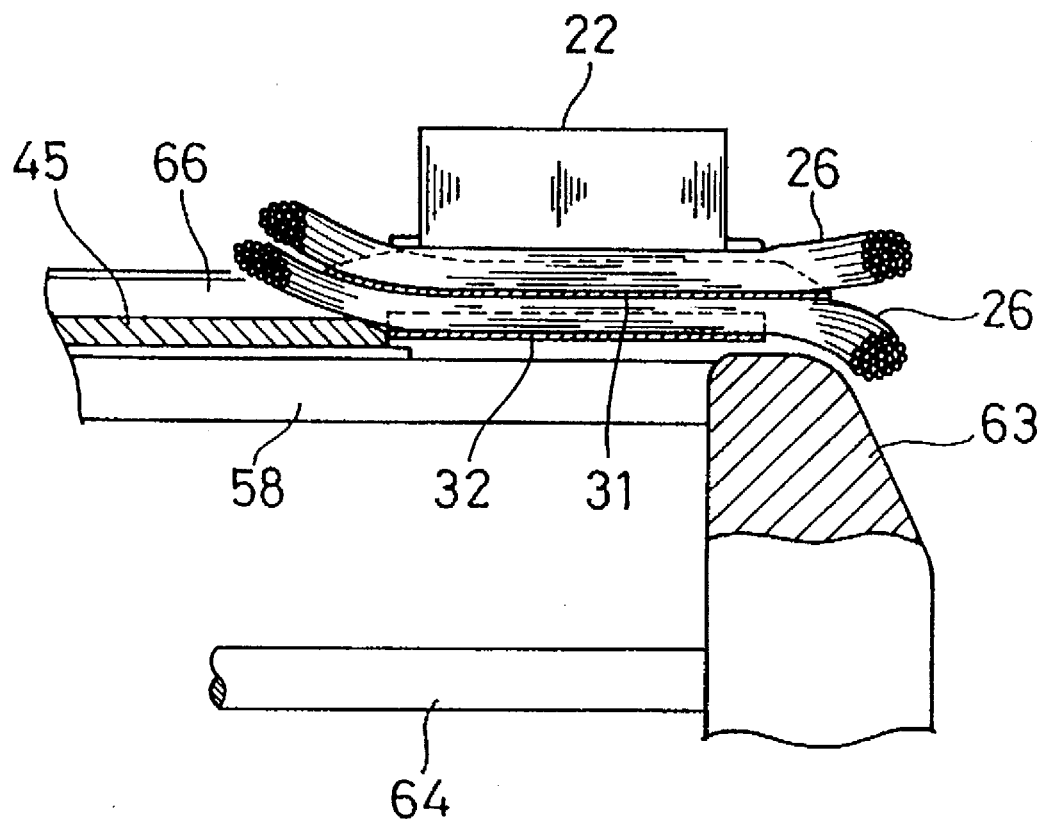
FIG. 16 is a partial longitudinally sectional side view of the wedge inserter in a wedge inserting operation.

The motors 8 and 12 are operated to move the core holder 5, so that the stator core 22 is fitted onto the coil inserting jig 55. In this condition, the servomotor 49 is driven to move the moving base 47 and the rod 52 to the side of the stator core 22. Then, the coils 26 and the wedges 32 are inserted into the core slots 23 by the stripper 63 and the wedge pushers 45. Since the wedge 32 is shorter than the layer insulator 31 as shown in FIG. 16, each wedge pusher 45 is previously forwarded by a predetermined amount by the cylinder 51 and subsequently, the servomotor 49 is operated to move the stripper 63 and the wedge pushers 45 to the side of the core 22 so that the coils 26 are inserted into the slots 23. The stripper 63 is inserted to the same position as of the first- to third-layer coils. Each wedge pusher 45 is pushed out from the insert location of the first- to third-layer coils to the side of the core 22 by one half of the difference in the whole length between the wedge 32 and the layer insulator 31. Subsequently, the motors 49, 8 and 12 are reverse rotated so that the stripper 63, the wedge pushers 45 and the core holder 5 are returned to the respective former positions. The core 22 is taken out of the core holder 5.

Figure 17:
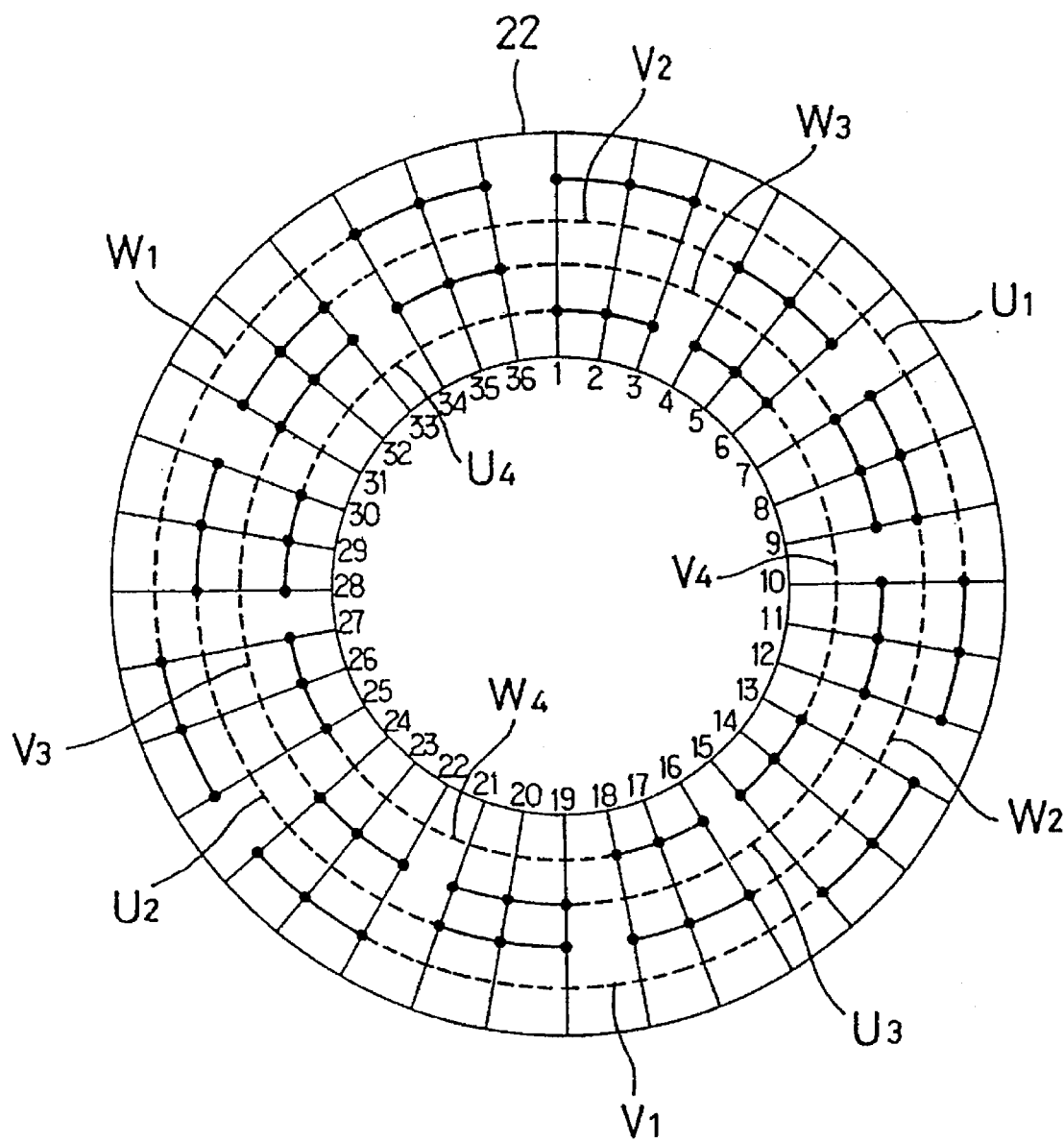
FIG. 17 illustrates another wiring pattern.
Figure 18:
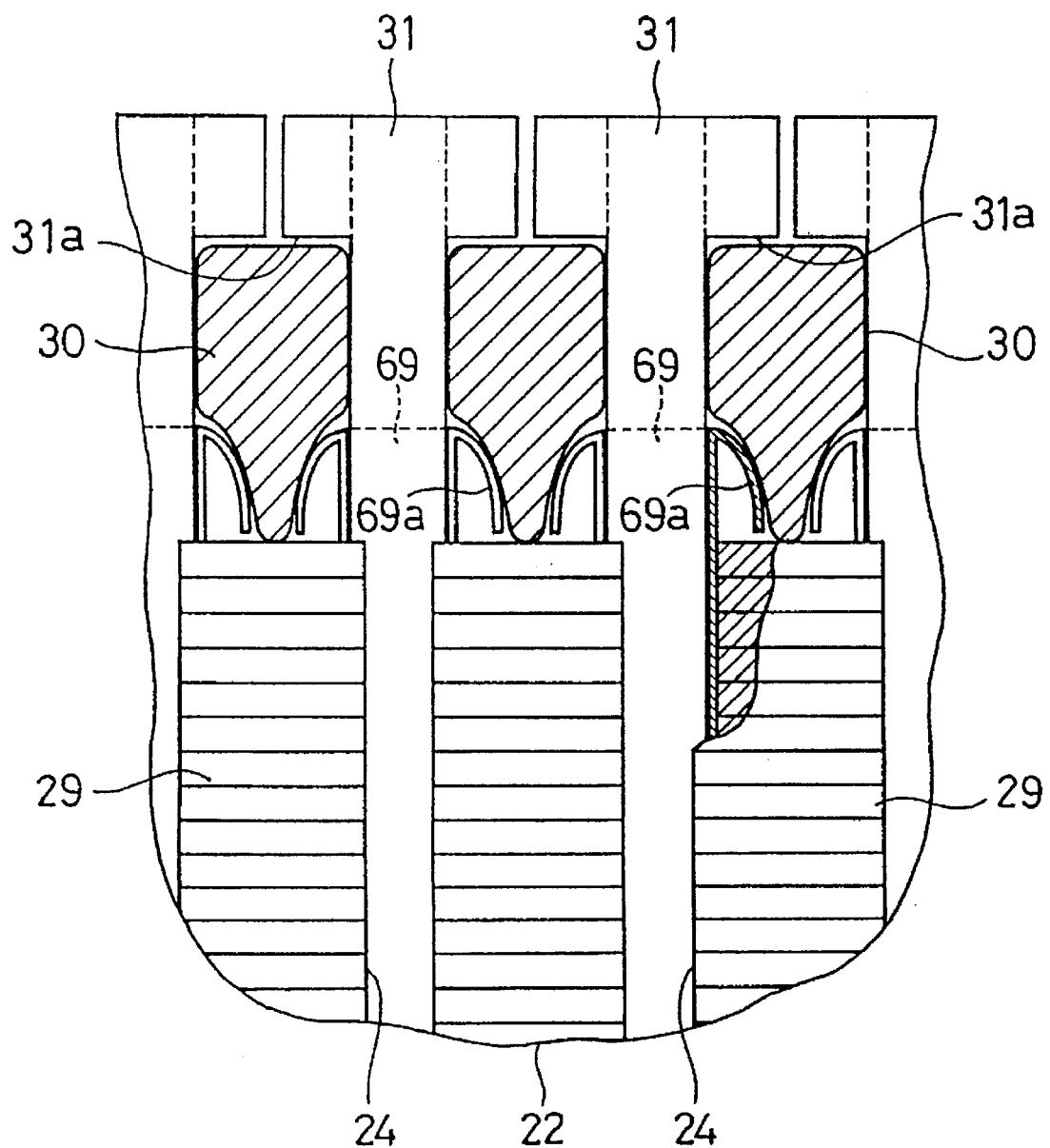
FIG. 18 is a view similar to FIG. 12, showing disposition of the coil guides and layer insulators.
Figure 19:
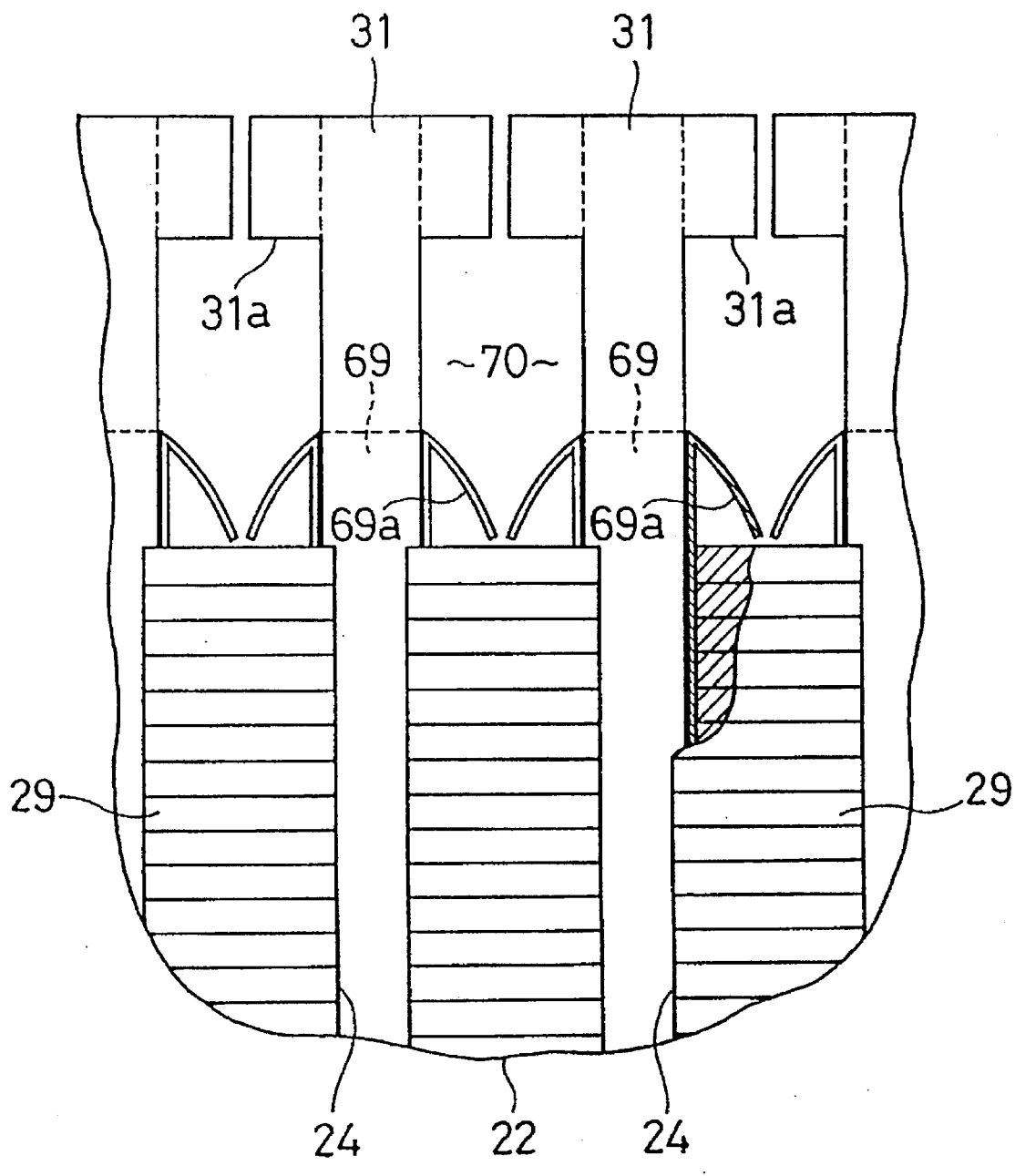
FIG. 19 is also a view similar to FIG. 12, showing that the cuff holders have been pulled out.

The coils 31, the layer insulators 26 and the wedges 32 can be inserted into the core slots 23 in the same manner as described above so that the winding pattern as shown in FIG. 17 is formed. Furthermore, in either winding pattern, the cuff holders 30 are previously inserted between one cuff 69a of the slot insulators 69 and the opposite cuff 69a of the adjacent slot insulators 69 respectively so as to be in contact with the cuffs 69a. Consequently, the coils, the wedges and the layer insulators can be prevented from being caught on the cuffs 69a during the coil insertion. Thus, since the cuffs 69a can be protected, occurrence of warp in the slot insulators 69 can be prevented. Furthermore, the cuff holders 30 are engaged with stepped portions 31a of the layer insulators 31 as shown in FIG. 18, respectively. Consequently, the layer insulators 31 can be prevented from being displaced with insertion of the coils. Additionally, since the cuff holders 30 are pulled out after all the coils 26 have been inserted in the respective slots 23 and shaped, the spaces in which the cuff holders 30 were inserted can be utilized as paths 70 of air cooling the coil ends 26a and 26b.

Although the guide cylinder 15 of the coil shaper 4 is rotated in the coil shaping step in the foregoing embodiment, the stator core 22 may be rotated instead.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A method of inserting a plurality of coils and a plurality of slot insulators into a plurality of slots of a stator core of a dynamoelectric machine, the method comprising steps of:

moving a coil inserting jig to a layer insulator inserter and transferring a plurality of layer insulators from the layer insulator inserter to the coil inserting jig;

fitting the stator core into the coil inserting jig holding a plurality of first coils;

inserting the plurality of layer insulators and the plurality of first coils both held on the coil inserting jig into the plurality of slots of the stator core by a wedge inserter respectively;

moving the coil inserting jig and a core holder to the wedge inserter and fitting the stator core held on the core holding onto the coil inserting jig holding a plurality of second coils; and inserting a plurality of wedges in the wedge inserter and the plurality of second coils held on the coil inserting jig into the plurality of slots of the stator core by the wedge inserter respectively.

2. A method of inserting a plurality of coils and a plurality of slot insulators into a plurality of slots of a stator core of a dynamoelectric machine, the method comprising steps of:

moving a coil inserting jig to a layer insulator inserter and transferring a plurality of layer insulators from the layer insulator inserter to the coil inserting jig;

moving the coil inserting jig and a core holder holding the stator core to a wedge inserter and fitting the stator core onto the coil inserting jig holding a plurality of first coils;

inserting the plurality of layer insulators and the plurality of first coils both held on the coil inserting jig into the plurality of slots of the stator core by the wedge inserter respectively;

moving the coil inserting jig to the layer insulator inserter and transferring a plurality of lower layer insulators from the layer insulator inserter to the coil inserting jig;

moving the coil inserting jig and the core holder to the wedge inserter and fitting the stator core held on the core holder onto the coil inserting jig holding a plurality of second coils;

inserting a plurality of upper wedges held on the wedge inserter, the plurality of lower layer insulators and the plurality of second coils both held on the coil inserting jig into the plurality of slots of the stator core by the wedge inserter respectively;

fitting the stator core held on the core holder onto the coil inserting jig holding a plurality of third coils; and inserting another plurality of wedges and the plurality of third coils held on the coil inserting jig into the plurality of slots of the stator core by the wedge inserter respectively.

3. A method of inserting a plurality of coils and a plurality of slot insulators into a plurality of slots of a stator core of a dynamoelectric machine, the method comprising steps of:

cutting an insulating material in a layer insulator inserter into a plurality of cut pieces, shaping the plurality of cut pieces of the insulating material into a plurality of layer insulators, and holding the layer insulators;

moving a coil inserting jig to the layer insulator inserter and pushing the plurality of layer insulators held on the layer insulator inserter out to the coil inserting jig by a plurality of layer insulator pushers of the layer insulator inserter, thereby transferring the plurality of layer insulators to the coil inserting jig so that the plurality of layer insulators are held on the coil inserting jig;

moving the coil inserting jig and a core holder holding the stator core to a wedge inserter and fitting the stator core onto the coil inserting jig holding a plurality of first coils;

inserting the plurality of layer insulators and the plurality of first coils both held on the coil inserting jig into the plurality of slots of the stator core by a plurality of wedge pushers and a stripper of the wedge inserter respectively;

moving the coil inserting jig to the layer insulator inserter and transferring a plurality of lower layer insulators held on the layer insulator inserter to the coil inserting jig by the plurality of layer insulator pushers so that the plurality of lower layer insulators are held on the coil inserting jig;

moving the coil inserting jig and the core holder to the wedge inserter and fitting the stator core held on the core holder onto the coil inserting jig holding a plurality of second coils;

cutting an insulating material in the wedge inserter into a plurality of cut pieces, inserting a plurality of upper wedges obtained by shaping the plurality of cut pieces of the insulating material into the plurality of upper wedgees held on the wedge inserter, and another plurality of layer insulators held on the coil inserting jig into the plurality of slots of the stator core by the plurality of wedge pushers respectively, and inserting the plurality of second coils held on the coil inserting jig into the plurality of slots by the stripper respectively;

cutting an insulating material in the wedge inserter into a plurality of cut pieces, shaping the plurality of cut pieces of the insulating material into a plurality of wedges, and holding the plurality of wedges;

fitting the stator core held on the core holder onto the coil inserting jig holding a plurality of third coils; and inserting the plurality of wedges held on the wedge inserter and the plurality of third coils held on the coil inserting jig into the plurality of slots of the stator core by the plurality of wedge pushers and the stripper respectively.

4. A method of inserting a plurality of coils and a plurality of slot insulators into a plurality of slots of a stator core of a dynamoelectric machine, the method comprising steps of:

cutting an insulating material in a layer insulator inserter into a plurality of cut pieces, shaping the cut pieces of the insulating material into a plurality of layer insulators, and holding the plurality of layer insulators on the layer insulator inserter;

moving a coil inserting jig to the layer insulator inserter and pushing the plurality of layer insulators held on the layer insulator inserter out to the coil inserting jig by a plurality of layer insulator pushers of the layer insulator inserter respectively, thereby transferring the plurality of layer insulators to the coil inserting jig so that the layer insulators are held on the coil inserting jig;

moving the coil inserting jig and a core holder holding the stator core to a wedge inserter and fitting the stator core onto the coil inserting jig holding a plurality of first coils;

inserting the plurality of layer insulators and the plurality of first coils both held on the coil inserting jig into the plurality of slots of the stator core by a plurality of wedge pushers and a stripper of the wedge inserter respectively;

cutting an insulating material in a wedge inserter into a plurality of cut pieces, shaping the plurality of cut pieces of the insulating material into a plurality of wedges, and holding the plurality of wedges;

fitting the stator core held on the core holder onto the coil inserting jig holding a plurality of second coils; and inserting the plurality of wedges held on the wedge inserter and the plurality of second coils held on the coil inserting jig into the plurality of slots of the stator core by the plurality of wedge pushers and the stripper respectively.

5. An apparatus for inserting a plurality of coils and a plurality of slot insulators into a plurality of slots of a stator core of a dynamoelectric machine, the apparatus comprising:

a base;

a layer insulator inserter for cutting an insulating material into a plurality of cut pieces, for shaping the plurality of cut pieces of the insulating material into a plurality of layer insulators, and for pushing the plurality of layer insulators out;

a wedge inserter for cutting another insulating material into a plurality of cut pieces, for shaping the plurality of cut pieces of the insulating material into a plurality of wedges, and for pushing the plurality of wedges out;

a coil inserting jig having a plurality of insulator guides each movable between the layer insulator inserter and the wedge inserter for guiding the plurality of layer insulators pushed out of the layer insulator inserter when the coil inserting jig is moved to a layer insulator side and for guiding the plurality of wedges pushed out of the wedge inserter when the coil inserting jig is moved to a wedge inserter side, the coil inserting jig further having a coil guide for guiding the plurality of coils;

a core holder movably mounted on the base for holding the stator core having the plurality of slots and for fitting the stator core onto the coil inserting jig when moved to the wedge inserter side; and a stripper provided on at least one of the layer insulator inserter and the wedge inserter, for pushing out the plurality of coils held on the coil guide of the coil inserting jig.

6. The apparatus according to claim 5, wherein a layer insulator pushing stroke of the layer insulator inserter is shorter than a wedge pushing stroke of the wedge inserter and takes such a value that the plurality of layer insulators pushed out by the layer insulator inserter reaches the plurality of insulator guides of the coil inserting jig when the coil inserting jig is located at the layer insulator inserter side.

7. The apparatus according to claim 5, wherein a wedge pushing stroke of the wedge inserter is longer by about one half of a difference in an overall length between one layer insulator of the plurality of layer insulators and one wedge of the plurality of wedges than a layer insulator pushing stroke of the layer insulator inserter.

8. The apparatus according to claim 5, wherein a wedge pushing stroke of the wedge inserter is switchable.

9. The apparatus according to claim 5, further comprising:

a mounting frame mounted to the base;

a coil shaper mounted on the mounting frame, the coil shaper having a guide cylinder with a bullet-shaped guide portion;

a plurality of expanding pieces being annularly disposed around the guide cylinder in a position at a rear side of the bullet-shaped guide portion;

a plurality of planks being inserted into the guide cylinder and being annularly disposed, each of the plurality of planks having a tapered inclined face at a distal end;

a plurality of protrusions on the guide cylinder being formed in front of and behind the plurality of expanding pieces, each one of the plurality of protrusions for fitting into a respective opening of a respective one of the plurality of slots of the stator core; and a plurality of shaping fins being radially disposed on the guide cylinder.

10. An apparatus for inserting a plurality of coils and a plurality of slot insulators into a plurality of slots of a stator core of a dynamoelectric machine, the apparatus comprising:

a layer insulator inserter;

a wedge inserter;

a coil inserting jig provided to be movable between the layer insulating inserter and the wedge inserter;

a core holder provided to be movable between a predetermined location and the wedge inserter, the core holder holding a stator core having the plurality of slots so that the stator core is fitted onto the coil inserting jig, wherein the layer insulator inserter comprises:
first holding means for holding a plurality of layer insulators and a plurality of layer insulator pushers for pushing the plurality of layer insulators out so that the plurality of layer insulators are transferred to the coil inserting jig respectively, wherein the wedge inserter comprises:

second holding means for holding a plurality of wedges, a plurality of wedge pushers for pushing the plurality of wedges and the plurality of layer insulators held on the coil inserting jig out so that the plurality of wedges and the plurality of layer insulators are inserted into the plurality of slots of the stator core, respectively, and a stripper moved upon movement of the respective plurality of wedge pushers for pushing out the plurality of coils held on the coil inserting jig so that the plurality of coils are inserted into the plurality of slots of the stator core respectively.

11. The apparatus according to claim 10, wherein the layer insulator inserter further comprises a stripper moved upon movement of the respective plurality of layer insulator pushers for pushing out the plurality of coils held on the coil inserting jig so that the plurality of coils are inserted into the plurality of slots of the stator core.

12. The apparatus according to claim 10, wherein the first holding means comprises a layer insulator magazine having a plurality of grooves and being rotatably mounted on a casing.

13. The apparatus according to claim 10, wherein the second holding means comprises a wedge magazine having a plurality of grooves and being rotatably mounted on a casing.

14. The apparatus according to claim 13, wherein the wedge inserter further comprises rotation means for rotating the wedge magazine by a predetermined angle.

15. The apparatus according to claim 12, wherein the layer insulator inserter further comprises rotation means for rotating the layer insulator magazine by a predetermined angle.

* * * * *